United States Patent
Sirotkin

(10) Patent No.: US 9,538,418 B2
(45) Date of Patent: Jan. 3, 2017

(54) APPARATUS, SYSTEM AND METHOD OF COMMUNICATING WIRELESS LOCAL AREA NETWORK (WLAN) OFFLOADING INFORMATION BETWEEN CELLULAR MANAGERS

(71) Applicant: INTEL IP CORPORATION, Santa Clara, CA (US)

(72) Inventor: Alexander Sirotkin, Giv'on Hachadasha (IL)

(73) Assignee: INTEL IP CORPORATION, Santa Clara, CA (US)

(*) Notice: Subject to any disclaimer, the term of this patent is extended or adjusted under 35 U.S.C. 154(b) by 63 days.

(21) Appl. No.: 14/562,730

(22) Filed: Dec. 7, 2014

(65) Prior Publication Data

US 2015/0327117 A1  Nov. 12, 2015

Related U.S. Application Data

(60) Provisional application No. 61/990,689, filed on May 8, 2014.

(51) Int. Cl.
*H04W 28/02* (2009.01)
*H04W 28/08* (2009.01)

(52) U.S. Cl.
CPC ..... *H04W 28/0284* (2013.01); *H04W 28/0289* (2013.01); *H04W 28/08* (2013.01)

(58) Field of Classification Search
None
See application file for complete search history.

(56) References Cited

U.S. PATENT DOCUMENTS

| | | | |
|---|---|---|---|
| 2009/0047956 A1* | 2/2009 | Moe | H04J 11/0093 455/436 |
| 2011/0222523 A1 | 9/2011 | Fu et al. | |
| 2013/0065585 A1* | 3/2013 | Pelletier | H04W 4/02 455/435.1 |
| 2013/0077482 A1 | 3/2013 | Krishna et al. | |
| 2014/0029420 A1 | 1/2014 | Jeong et al. | |
| 2014/0334446 A1* | 11/2014 | Lim | H04W 28/08 370/331 |
| 2014/0341187 A1* | 11/2014 | Lei | H04W 76/022 370/331 |
| 2015/0045032 A1* | 2/2015 | Tomici | H04W 36/04 455/436 |

(Continued)

OTHER PUBLICATIONS

International Search Report and Written Opinion for International Patent Application No. PCT/US2015/024001, mailed on Jun. 30, 2015, 10 pages.

(Continued)

*Primary Examiner* — Diane Lo
(74) *Attorney, Agent, or Firm* — Shichrur & Co.

(57) ABSTRACT

Some demonstrative embodiments include devices, systems and/or methods of communicating Wireless Local Area Network (WLAN) offloading information between cellular managers. For example, a first cellular manager of a first cellular network may send to a second cellular manager of a second cellular network one or more WLAN offload parameters corresponding to Radio Access Network (RAN) assisted WLAN interworking information, which is sent to one or more User Equipment (UE) in the first cellular network.

25 Claims, 3 Drawing Sheets

(56) References Cited

U.S. PATENT DOCUMENTS

| | | | |
|---|---|---|---|
| 2015/0045038 A1* | 2/2015 | Gao | H04W 36/22 |
| | | | 455/438 |
| 2016/0050604 A1* | 2/2016 | Lee | H04W 76/046 |
| | | | 370/331 |

OTHER PUBLICATIONS

Huawei; "Possible scenarios for WLAN/3GPP Radio Interworking", R2-130366, 3GPP TSG-RAN WG2 #81, St. Julian's, Malta, Jan. 28-Feb. 1, 2013, 5 pages.

Intel Corporation; "Proposed way forward on WLAN/3GPP radio interworking", R2-140842, 3GPP TSG-RAN2 Meeting #85, Prague, Czech Republic, Feb. 10-14, 2014, 17 pages.

RP-132086; 3GPP TSG RAN#62; Busan, Korea, Dec. 3-6, 2013; "Study on Multi-RAT joint coordination"; 6 pages.

3GPP TS 36.300 V11.7.0 (Sep. 2013); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); Sep. 2013, 209 pages.

3GPP TS 36.331 V11.5.0 (Sep. 2013); 3rd Generation Partnership Project; Technical Specification Group Radio Access Network; Evolved Universal Terrestrial Radio Access (E-UTRA); Radio Resource Control (RRC); Protocol specification (Release 11); Sep. 2013; 347 pages.

3GPP TS 36.304 V12.0.0 (Mar. 2014); 3rd Generation Partnership Project; Technical Specification Group Radio Access Network; Evolved Universal Terrestrial Radio Access (E-UTRA); User Equipment (UE) procedures in idle mode (Release 12); Mar. 2014; 34 pages.

3GPP TS 25.300 V0.1.0 (Feb. 2014); 3rd Generation Partnership Project; Technical Specification Group Radio Access Network; UTRAN: General Description; Stage 2 (Release 12); Feb. 2014; 6 pages.

3GPP TS 25.304 V12.1.0 (Mar. 2014); 3rd Generation Partnership Project; Technical Specification Group Radio Access Network; User Equipment (UE) procedures in idle mode and procedures for cell reselection in connected mode (Release 12); Mar. 2014; 55 pages.

3GPP TS 36.423 V12.1.0 (Mar. 2014); 3rd Generation Partnership Project; Technical Specification Group Radio Access Network; Evolved Universal Terrestrial Radio Access Network (E-UTRAN); X2 application protocol (X2AP) (Release 12); Mar. 2014; 145 pages.

3GPP TS 24.312 V12.4.0 (Mar. 2014); 3rd Generation Partnership Project; Technical Specification Group Core Network and Terminals; Access Network Discovery and Selection Function (ANDSF) Management Object (MO) (Release 12); Mar. 2014; 280 pages.

3GPP TS 36.413 V12.1.0 (Mar. 2014); 3rd Generation Partnership Project; Technical Specification Group Radio Access Network; Evolved Universal Terrestrial Radio Access Network (E-UTRAN); S1 Application Protocol (S1AP) (Release 12); Mar. 2014; 285 pages.

3GPP TS 25.331 V12.1.0 (Mar. 2014); 3rd Generation Partnership Project; Technical Specification Group Radio Access Network; Radio Resource Control (RRC); Protocol specification (Release 12); Mar. 2014; 2120 pages.

International Preliminary Report on Patentability for PCT/US2015/024001, mailed on Nov. 17, 2016, 7 pages.

\* cited by examiner

APPARATUS, SYSTEM AND METHOD OF COMMUNICATING WIRELESS LOCAL AREA NETWORK (WLAN) OFFLOADING INFORMATION BETWEEN CELLULAR MANAGERS

CROSS REFERENCE

This application claims the benefit of and priority from U.S. Provisional Patent Application No. 61/990,689 entitled "WLAN interworking coordination between LTE and UMTS", filed May 8, 2014, the entire disclosure of which is incorporated herein by reference.

TECHNICAL FIELD

Some embodiments described herein generally relate to communicating Wireless Local Area Network (WLAN) offloading information between cellular managers.

BACKGROUND

A communication system may be configured to utilize multiple wireless communication technologies, e.g., including a plurality of Radio Access Technologies (RATs).

For example, a User Equipment (UE) device may be configured to utilize a cellular connection, e.g., a Universal Mobile Telecommunications System (UMTS) cellular connection or a Long Term Evolution (LTE) connection, as well as a wireless-local-area-network (WLAN) connection, e.g., a Wireless-Fidelity (WiFi) connection.

There is a need for efficient interworking, integration, coordination, and/or management of the multiple RATs.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
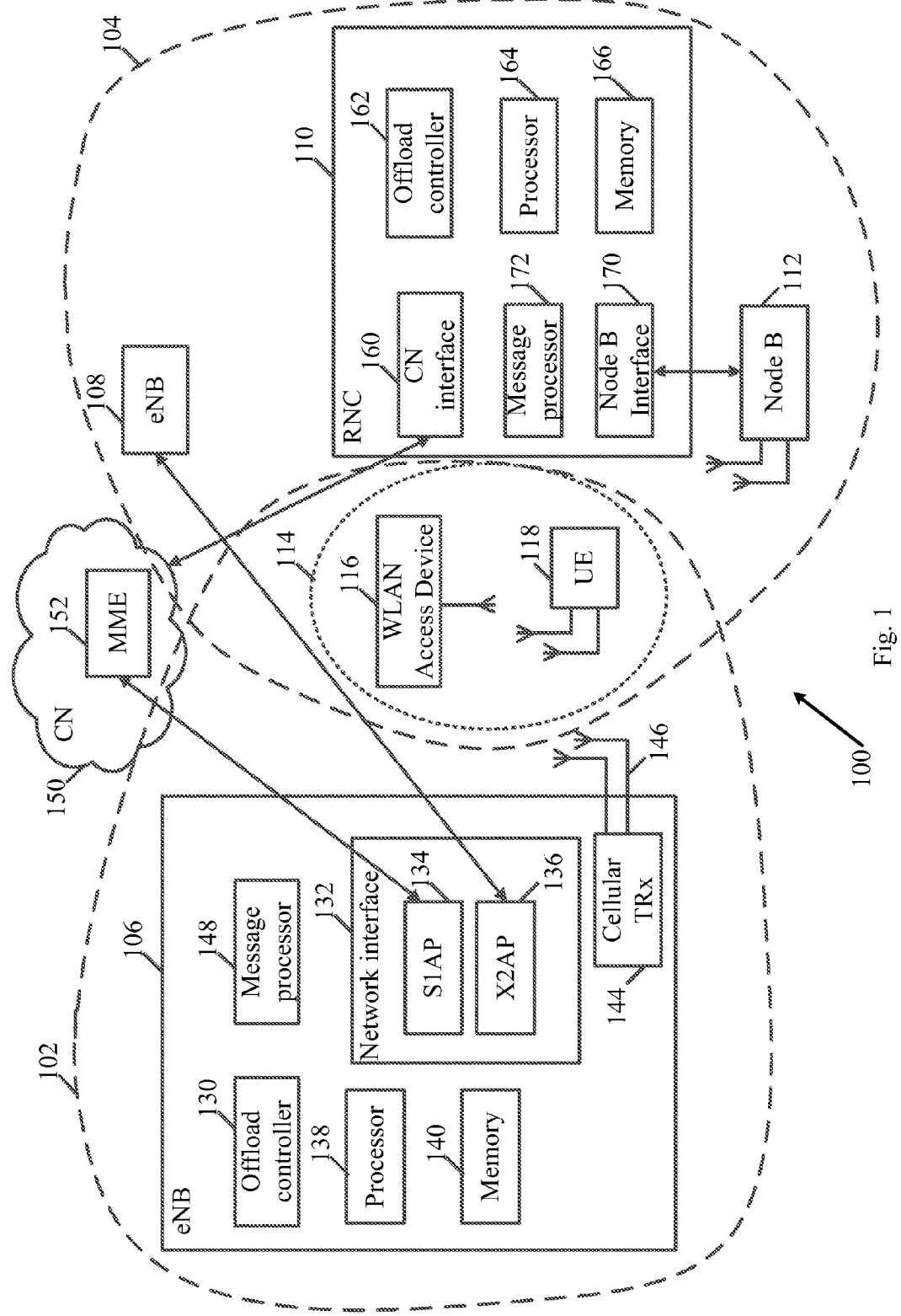
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wireless node, a base station (BS), a wired or wireless router, a wired or wireless modem, a video device, an audio device, an audio-video (A/V) device, a wired or wireless network, a wireless area network, a cellular network, a cellular node, a cellular device, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing 3rd Generation Partnership Project (3GPP) and/or Long Term Evolution (LTE) specifications (including 3GPP TS 36.300 (3*GPP TS* 36.300 *V*11.7.0 (2013-09); *Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage* 2 (*Release* 11)); 3GPP TS 36.331 (3*GPP TS* 36.331 *V*11.5.0 (2013-09); *Technical Specification; 3rd Generation Partnership Project; Technical Specification Group Radio Access Network; Evolved Universal Terrestrial Radio Access (E-UTRA); Radio Resource Con-* trol (RRC); Protocol specification (Release 11)); 3GPP TS 36.304 (3GPP TS 36.304 V12.0.0 (2014-03); Technical Specification; 3rd Generation Partnership Project; Technical Specification Group Radio Access Network; Evolved Universal Terrestrial Radio Access (E-UTRA); User Equipment (UE) procedures in idle mode, (Release 12)); 3GPP TS 25.300 (3GPP TS 25.300 V0.1.0 (2014-02); Technical Specification; 3rd Generation Partnership Project; Technical Specification Group Radio Access Network; UTRAN: General Description; Stage 2 (Release 12)); 3GPP TS 25.304 (3GPP TS 25.304 V12.1.0 (2014-03); Technical Specification; 3rd Generation Partnership Project; Technical Specification Group Radio Access Network; User Equipment (UE) procedures in idle mode and procedures for cell reselection in connected mode (Release 12)); 3GPP TS 25.331 (3GPP TS 25.331 V12.1.0 (2014-03); Technical Specification; 3rd Generation Partnership Project; Technical Specification Group Radio Access Network; Radio Resource Control (RRC); Protocol specification (Release 12)); a 3GPP TS 36.413 (3GPP TS 36.413 V12.1.0 (2014-03); Technical Specification; 3rd Generation Partnership Project; Technical Specification Group Radio Access Network; Evolved Universal Terrestrial Radio Access Network; (E-UTRAN); S1 Application Protocol (S1AP); (Release 12)); and/or 3GPP TS 36.423 (3GPP TS 36.423 V12.1.0 (2014-03); Technical Specification; 3rd Generation Partnership Project; Technical Specification Group Radio Access Network; Evolved Universal Terrestrial Radio Access Network (E-UTRAN); X2 application protocol (X2AP); (Release 12)) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012), and/or future versions and/or derivatives thereof, devices and/or networks operating in accordance with existing IEEE 802.16 standards (IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Multi-Input-Multi-Output (MIMO), Multi-User MIMO (MU-MIMO), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1XRTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit or interface, which is capable of communicating a communication signal, may include a transmitter to transmit the communication signal to at least one other communication unit, and/or a communication receiver to receive the communication signal from at least one other communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments are described herein with respect to a LTE network. However, other embodiments may be implemented in any other suitable cellular network or system, e.g., a Universal Mobile Telecommunications System (UMTS) cellular system, a GSM network, a 3G cellular network, a 4G cellular network, a 4.5G network, a 5G cellular network, a 6G cellular network, a WiMax cellular network, and the like.

Some demonstrative embodiments are described herein with respect to a WLAN system. However, other embodiments may be implemented in any other suitable non-cellular network.

Some demonstrative embodiments are described herein with respect to an Access Point (AP). However, other embodiments may be implemented in any other WLAN access device, for example, an Access Controller (AC).

Some demonstrative embodiments may be used in conjunction with a Heterogeneous Network (HetNet), which may utilize a deployment of a mix of technologies, frequencies, cell sizes and/or network architectures, e.g., including cellular, mmWave, and/or the like. In one example, the HetNet may include a radio access network having layers of different-sized cells ranging from large macrocells to small cells, for example, picocells and femtocells.

Other embodiments may be used in conjunction with any other suitable wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

The phrase "access point" (AP), as used herein, may include an entity that includes a station (STA) and provides access to distribution services, via the Wireless Medium (WM) for associated STAs.

The term "station" (STA), as used herein, may include any logical entity that is a singly addressable instance of a medium access control (MAC) and a physical layer (PHY) interface to the WM.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums.

In some demonstrative embodiments, elements of system 100 may be configured to communicate, for example, over a radio channel, a cellular channel, an RF channel, a WLAN channel, a Wireless Fidelity (WiFi) channel, an IR channel, and the like. One or more elements of system 100 may optionally be capable of communicating over any suitable wired communication links.

In some demonstrative embodiments, system 100 may include a multi-RAT network, which may utilize a plurality of RATs, for example, to communicate with at least one User Equipment (UE) 118, e.g., as described below.

In some demonstrative embodiments, UE 118 may include, for example, a mobile computer, a MD, a STA, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, system 100 may include a plurality of RAT communication managers to control and/or manage communication in a plurality of RAT networks. For example, system 100 may include one or more cellular managers of one or more types of cellular networks, one or more WLAN managers of one or more WLANs, and/or any other element capable of controlling and/or managing communication in any other RAT network, e.g., as described below.

In some demonstrative embodiments, system 100 may include one or more cellular managers to manage communication of one or more cellular networks, e.g., as described below.

In some demonstrative embodiments, the one or more cellular managers may include one or more Evolved Node B (eNB), e.g., eNB 106 and/or eNB 108. For example, eNB 106 and/or eNB 108 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or a Core Network (CN) 150, scheduling and/or transmitting paging messages, e.g., incoming calls and/or connection requests, broadcast information coordination, measurement reporting, and/or any other operations.

In some demonstrative embodiments, the one or more cellular managers may include cellular managers of a UMTS. According to this example, system 100 may include one or more Radio Network Controllers (RNCs) 110, which may control a plurality of Node B devices 112. For example, the node B devices 112 may be configured to communicate directly with UEs, e.g., including UE 118, for example, using a Wideband Code Division Multiple Access (WCDMA) and/or Time Division Synchronous Code Division Multiple Access (TD-SCDMA) air interface technology. RNC 110 may include, for example, a UMTS RNC configured to control the Node B devices 112.

In some demonstrative embodiments, the one or more cellular managers may include any other cellular managers, for example, one or more cellular Base Stations (BSs), e.g., of a GSM network, and/or any other cellular node, network controller, base station or any other node or network device.

In some demonstrative embodiments, system 100 may include one or more WLAN managers to manage communication of one or more WLANs, e.g., as described below.

In some demonstrative embodiments, system 100 may include at least one WLAN access device 116 to manage access to a non-cellular network, for example, a WLAN, e.g., a Basic Service Set (BSS).

In some demonstrative embodiments, WLAN access device 116 may include a WLAN AP. In other embodiments, WLAN access device 116 may include any other functionality and/or may perform the functionality of any other device capable of controlling and/or managing WLAN radio access to one or more wired networks. In one example, WLAN access device 116 may perform the functionality of an Access Controller (AC). According to this example, WLAN access device 116 may control a plurality of AP devices, e.g., Lightweight Access Point (LAP) devices (not shown).

In some demonstrative embodiments, eNB 106 and/or eNB 108 may include a network interface 132 to communicate with one or more network elements of system 100, e.g., as described below.

In some demonstrative embodiments, interface 132 may include an X2 Application Protocol (X2AP) interface 136 to communicate messages between eNB 106 and eNB 108, e.g., as described below.

In some demonstrative embodiments, interface 132 may include an S1 Application protocol (S1AP) interface 134 to communicate messages between eNB 106 and one or more elements of CN 150, e.g., a Mobility Management Entity (MME) 152.

In some demonstrative embodiments, RNC 110 may include a CN interface 160 to communicate with one or more elements of CN 150. For example, CN interface 160 may include an Interface Unit Circuit Switch (Iu-CS) interface and/or an Interface Unit Packet Switch (Iu-PS) interface, to interface between RNC 110 and one or more packet-switched or circuit-switched CN elements.

In some demonstrative embodiments, eNB 106 and/or eNB 108 may communicate with RNC 110 via CN 150, e.g., as described below.

In some demonstrative embodiments, eNB 106, eNB 108, RNC 110, and/or WLAN access device 116 may include an interface to communicate user plane traffic, directly or indirectly, with UE 118.

In some demonstrative embodiments, eNB 106 and/or eNB 108 may include an air interface, for example, a cellular transceiver (TRx) 144, configured to communicate with UE 118 via a cellular link.

In some demonstrative embodiments, RNC 110 may communicate user plane traffic with UE 118 via Node B 112. According to these embodiments, RNC 110 may include a Node B interface 170 to communicate between RNC 110 and Node B 112. For example, Node B interface 170 may include an Interface Unit b (Iub).

In some demonstrative embodiments, WLAN access device 116 may include an interface to communicate traffic, directly or indirectly, with UE 118. In some demonstrative embodiments, WLAN access device 116 may communicate directly with UE 118, for example, if WLAN access device 116 performs the functionality of an AP. According to these embodiments, WLAN access device 116 may include a WLAN radio (not shown) to communicate traffic directly with UE 118, e.g., via a WLAN link between WLAN access device 116 and UE 118, for example, if WLAN access device 116 performs the functionality of an AP. In some demonstrative embodiments, WLAN access device 116 may indirectly communicate with UE 118, for example, if WLAN access device 116 performs the functionality of an AC. According to these embodiments, WLAN access device 116 may include an AP interface (not shown) to communicate traffic with UE 118, e.g., via a LAP.

In some demonstrative embodiments, eNB 106, eNB 108, and/or RNC 110 may also include, for example, a processor, a memory unit, and/or any other element, module or unit. For example, eNB 106 and/or eNB 108 may include a memory 140 and/or a processor 138; and/or RNC 110 may include a memory 166 and/or a processor 164. In some demonstrative embodiments, eNB 106, eNB 108 and/or RNC 110 may optionally include other suitable hardware components and/or software components. In some demonstrative embodiments, some or all of the components of one or more of eNB 106, eNB 108, and/or RNC 110 may be enclosed in a common housing or packaging, and may be interconnected or operably associated using one or more wired or wireless links. In other embodiments, components of one or more of eNB 106, eNB 108, and/or RNC 110 may be distributed among multiple or separate devices.

Processors 138 and/or 164 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 138 may execute instructions, for example, of an Operating System (OS) of eNB 106 and/or of one or more suitable applications; and/or processor 164 may execute instructions, for example, of an Operating System (OS) of RNC 110 and/or of one or more suitable applications.

Memory units 140 and/or 166 include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. For example, memory unit 140 may store data processed by eNB 106; and/or memory unit 166 may store data processed by RNC 110.

In some demonstrative embodiments, eNB 106, eNB 108, and/or RNC 110 may include at least one offload controller to control one or more functionalities, communications and/or interactions corresponding to one or more offloading functionalities, e.g., as described below. For example, eNB 106 and/or eNB 108 may include an offload controller 130 to control one or more offloading functionalities of eNB 106 and/or 108; and/or RNC 110 may include an offload controller 162 to control one or more offloading functionalities of RNC 110, e.g., as described below.

In some demonstrative embodiments, offload controller 130 and/or offload controller 162 may include or may be implemented using suitable controller circuitry, e.g., processor circuitry, memory circuitry, and/or any other circuitry, which may be configured to perform at least part of the functionality of offload controller 130 and/or offload controller 162. Additionally or alternatively, one or more functionalities of offload controller 130 and/or offload controller 162 may be implemented by logic, which may be executed by a machine and/or one or more processors, e.g., as described below.

In some demonstrative embodiments, eNB 106 and/or eNB 108 may include a message processor 148 configured to generate, process and/or access one or messages communicated by eNB 106 and/or eNB 108.

In one example, message processor 148 may be configured to generate one or more messages to be transmitted by eNB 106 or eNB 108, and/or message processor 148 may be configured to access and/or to process one or more messages received by eNB 106 or eNB 108, e.g., as described below.

In some demonstrative embodiments, RNC 110 may include a message processor 172 configured to generate, process and/or access one or messages communicated by RNC 110.

In one example, message processor 172 may be configured to generate one or more messages to be transmitted by RNC 110, and/or message processor 172 may be configured to access and/or to process one or more messages received by RNC 110, e.g., as described below.

In some demonstrative embodiments, message processors 148 and/or 172 may include circuitry, e.g., processor circuitry, memory circuitry, Media-Access Control (MAC) circuitry, Physical Layer (PHY) circuitry, and/or any other circuitry, configured to perform the functionality of message processors 148 and/or 172. Additionally or alternatively, one or more functionalities of the proximity estimators message processors 148 and/or 172 may be implemented by logic, which may be executed by a machine and/or one or more processors, e.g., as described below.

In some demonstrative embodiments, at least part of the functionality of message processor 148 may be implemented as part of interface 132 and/or cellular TRX 144, and/or at least part of the functionality of message processor 172 may be implemented as part of interfaces 160 and/or 170.

In some demonstrative embodiments, at least part of the functionality of message processor 148 may be implemented as part of offload controller 130, and/or at least part of the functionality of message processor 172 may be implemented as part of offload controller 162.

In other embodiments, the functionality of message processor 148 may be implemented as part of any other element of eNB 106, and/or the functionality of message processor 172 may be implemented as part of any other element of RNC 110.

In some demonstrative embodiments, cellular TRx 144 may include one or more wireless transmitters, receivers and/or transceivers including circuitry and/or logic able to send and/or receive wireless communication signals, RF signals, frames, blocks, transmission streams, packets, messages, data items, and/or data.

In some demonstrative embodiments, cellular TRx 144 may include a multiple input multiple output (MIMO) transmitters receivers system (not shown), which may be capable of performing antenna beamforming methods, if desired. In other embodiments, cellular TRx 144 may include any other transmitters and/or receivers.

In some demonstrative embodiments, cellular TRx 144 may include LTE, WCDMA and/or TD-SCDMA modulators and/or demodulators (not shown) configured to communicate downlink signals over downlink channels, e.g., between eNB 106 and UE 118, and uplink signals over uplink channels, e.g., between UE 118 and eNB 106. In other embodiments, cellular TRx 144 may include any other modulators and/or demodulators.

In some demonstrative embodiments, UE 118 may establish a WLAN link with WLAN access device 116. For example, the WLAN link may include an uplink and/or a downlink.

In some demonstrative embodiments, eNB 106, eNB 108, UE 118, WLAN access device 116, and/or Node B 112 may include, or may be associated with, one or more antennas. In one example, cellular TRx 144 may be associated with at least two antennas 146 or any other number of antennas, e.g., one antenna or more than two antennas; UE 118 may be associated with at least two antennas, or any other number of antennas, e.g., one antenna or more than two antennas; WLAN access device 116 may be associated with one or more antennas; and/or Node B 112 may be associated with one or more antennas.

In some demonstrative embodiments, antennas 146 may include any type of antennas suitable for transmitting and/or receiving wireless communication signals, blocks, frames, transmission streams, packets, messages and/or data. For example, antennas 146 may include any suitable configuration, structure and/or arrangement of one or more antenna elements, components, units, assemblies and/or arrays. For example, antennas 146 may include a phased array antenna, a dipole antenna, a single element antenna, a set of switched beam antennas, and/or the like.

In some embodiments, antennas 146 may implement transmit and receive functionalities using separate transmit and receive antenna elements. In some embodiments, antennas 146 may implement transmit and receive functionalities using common and/or integrated transmit/receive elements.

In some demonstrative embodiments, UE 118 may be configured utilize a cellular connection, e.g., a LTE cellular connection, a UMTS cellular connection, or any other cellular connection, to communicate with eNB 106, eNB 108, and/or Node B 112; and a WLAN connection, e.g., a Wireless-Fidelity (WiFi) connection, a mmWave connection, or any other WLAN connection, to communicate with WLAN access device 116.

In some demonstrative embodiments, one or more elements of system 100 may perform the functionality of a HetNet, which may utilize a deployment of a mix of technologies, frequencies, cell sizes and/or network architectures, for example, including cellular, WLAN, and/or the like.

For example, the HetNet may be configured to provide a service through a first wireless communication environment, e.g., a cellular network, and to maintain the service when switching to another communication environment, e.g., WLAN. The HetNet architecture may enable utilizing a mixture of wireless communication environments, e.g., a WLAN environment and a cellular environment, for example, to optimally respond to rapid changes in customer demand, reduce power consumption, reduce cost, increase efficiency and/or achieve any other benefit.

In one example, system 100 may utilize a Multi-tier, Multi-RAT Het-Net architecture, including a tier of small cells, e.g., pico, femto, relay stations, WiFi APs, and the like, overlaid on top of a macro cellular deployment to augment network capacity.

In another example, system 100 may utilize Multi-RAT small cells integrating multiple radios such as WiFi and 3GPP air interfaces in a single infrastructure device.

In other embodiments, system 100 may implement any other architecture and/or deployment.

In some demonstrative embodiments, eNB 106, eNB 108, and/or RNC 110 may be configured to enable Multi-RAT joint coordination, for example, between multiple RAT networks, for example, LTE, UMTS, GSM, CDMA, and/or WLAN, e.g., as described below.

In some demonstrative embodiments, eNB 106, eNB 108, and/or RNC 110 may implement a multi-RAT coordination scheme, for example, which may be configured to build on top of Rel-12 WLAN/3GPP Radio Interworking solutions defined in RAN2, e.g., as described below.

In some demonstrative embodiments, eNB 106, eNB 108, and/or RNC 110 may be configured to perform multi-RAT coordination with respect to at least two networks, for example, a cellular network and a WLAN.

In some demonstrative embodiments, eNB 106, eNB 108, and/or RNC 110 may be configured to perform multi-RAT coordination with respect to at least three networks, e.g., simultaneously.

In some demonstrative embodiments, the at least three networks may include, for example, two cellular networks and a WLAN, e.g., a WLAN controlled by WLAN access device 116.

In some demonstrative embodiments, the two cellular networks may include two LTE networks, e.g., a first network controlled by a first eNB, e.g., eNB 106, and a second network controlled by a second eNB, e.g., eNB 108.

In some demonstrative embodiments, the two cellular networks may include an LTE network, for example, a network controlled by an eNB, e.g., eNB 106, and a UMTS network, for example, a network controlled by a RNC, e.g., RNC 110.

In some demonstrative embodiments, UE 118 may be within coverage of a plurality of networks. In one example, UE 118 may be within a coverage range 114 of WLAN access device 116, a coverage range 102 of eNB 106, and a coverage range 104 of at least one other cellular manager, e.g., eNB 108 and/or RNC 110.

In some demonstrative embodiments, UE 118 may be capable of operating according to a WLAN offloading scheme, e.g., as described below.

In some demonstrative embodiments, UE 118 may be capable of performing handover between cells controlled by eNBs, e.g., eNB 106 and eNB 108, and/or between cells controlled by an eNB, e.g., eNB 106 or eNB 108, and cells controlled by a RNC, e.g., RNC 110.

In some demonstrative embodiments, eNB 106, eNB 108, and/or RNC 110 may be configured to perform one or more offloading and/or load balancing operations, e.g., as described below.

In some demonstrative embodiments, eNB 106, eNB 108, and/or RNC 110 may be configured to implement a first offloading mechanism ("WLAN offload") configured to enable one or more UEs, e.g., UE 118, to offload to a WLAN, e.g., to WLAN access device 116. The WLAN offload may include, for example, traffic steering and/or traffic routing of traffic of a UE, e.g., one or more traffic streams, from a cellular network to a WLAN and/or from a WLAN to a cellular network.

In some demonstrative embodiments, eNB 106, eNB 108, and/or RNC 110 may be configured to implement a second offloading mechanism ("cellular offload" or "handover") configured to handover one or more UEs from one cellular network, e.g., between two cellular managers of the same cellular technology, e.g., between eNB 106 and eNB 108, or between cellular managers of different cellular technologies, e.g., between the cell controlled by eNB 106 and the cell controlled by RNC 110 (also referred to as "offload from eNB to RNC"). The cellular offload may include, for example, traffic steering and/or traffic routing of traffic of a UE, e.g., one or more traffic streams, from one cellular network to another cellular network.

In some demonstrative embodiments, the WLAN offloading mechanism may include a UE-centric (also referred to as "UE controlled") access network selection and/or traffic steering scheme, in which UE 118 may select an access network to be utilized by UE 102, and/or select which traffic streams to steer to that access network.

In some demonstrative embodiments, UE 118 may be configured to receive assistance information, for example, Radio Access Network (RAN) assisted WLAN interworking information, including one or more parameters (also referred to as "RAN assisted WLAN interworking parameters") from one or more elements of system 100.

In some demonstrative embodiments, UE 118 may receive the RAN assisted WLAN interworking parameters from one or more cellular managers. For example, a cellular manager may be configured to determine RAN assisted WLAN interworking parameters corresponding to a cellular network controlled by the cellular manager, e.g., as described below.

In some demonstrative embodiments, offload controller 130 of eNB 106 may be configured to determine RAN assisted WLAN interworking parameters corresponding to the cellular network controlled by eNB 106, e.g., as described below.

In some demonstrative embodiments, eNB 106 may send to UE 118 the RAN assisted WLAN interworking parameters corresponding to the cellular network controlled by eNB 106. For example, message processor 148 of eNB 132 may generate one or more messages, e.g., Radio Resource Control (RRC) broadcast and/or dedicated messages, including the RAN assisted WLAN interworking parameters corresponding to the cellular network controlled by eNB 106, and cellular TRx 144 may transmit the messages to be received by one or more UEs, e.g., by transmitting RRC messages dedicated to UE 118 and/or by broadcasting one or more messages to be received by UEs within coverage area 102.

In some demonstrative embodiments, eNB 108 may be configured to determine RAN assisted WLAN interworking parameters corresponding to the cellular network controlled by eNB 108, and may transmit one or more messages, e.g., RRC broadcast and/or dedicated messages, including the RAN assisted WLAN interworking parameters corresponding to the cellular network controlled by eNB 108 to be received by one or more UEs, e.g., by transmitting RRC messages dedicated to UE 118 and/or by broadcasting one or more messages to be received by UEs within coverage area 104.

In some demonstrative embodiments, offload controller 162 of RNC 110 may be configured to determine RAN assisted WLAN interworking parameters corresponding to the cellular network controlled by RNC 110, e.g., as described below.

In some demonstrative embodiments, RNC 110 may send to UE 118 the RAN assisted WLAN interworking parameters corresponding to the cellular network controlled by RNC 110. For example, message processor 170 of RNC 110 may generate one or more messages including the RAN assisted WLAN interworking parameters corresponding to the cellular network controlled by RNC 110, and interface 170 may send the messages to UE 118, e.g., via Node B 112.

In some demonstrative embodiments, the RAN assisted WLAN interworking parameters may include, for example, at least one cellular parameter threshold, at least one WLAN parameter threshold, at least one offload preference indicator (OPI), and/or any other parameter, indicator, and/or threshold.

In one example, the at least one cellular parameter threshold may include, for example, a Reference Signal Received Power (RSRP) threshold.

In another example, the at least one cellular parameter threshold may include, for example, a Received Signal Code Power (RSCP) threshold, for example, a UMTS Common pilot Channel (CPICH) RSCP threshold, e.g., for Frequency Division Duplexing (FDD), or a UMTS Primary Common Control Physical Channel (PCCPCH) RSCP threshold, e.g., for Time Division Duplexing (TDD).

In another example, the at least one cellular parameter threshold may include, for example, a Reference Signal Received Quality (RSRQ) threshold.

In another example, the at least one cellular parameter threshold may include, for example, a UMTS CPICH Energy Per Chip (Ec) to a Noise power (No) (Ec/No) threshold, e.g., fro FDD.

In another example, the at least one cellular parameter threshold may include any other cellular parameter threshold.

In one example, the at least one WLAN parameter threshold may include, for example, a WLAN Channel utilization threshold, e.g., corresponding to a WLAN channel utilization value in a BSS load Information Element (IE), e.g., as received from WLAN access device 116.

In another example, the at least one WLAN parameter threshold may include, for example, an available WLAN backhaul capacity threshold, for example, an available WLAN DL and UL backhaul data rate threshold.

In another example, the at least one WLAN parameter threshold may include, for example, a WLAN signal strength threshold, e.g., a Received Signal Strength Indicator (RSSI) threshold, a Beacon Received Signal Strength Indicator (BeaconRSSI) threshold, a Received Signal to Noise Indicator (RSNI) threshold, a Received Channel Power Indicator (RCPI) threshold, and/or any other WLAN signal strength threshold.

In another example, the at least one WLAN parameter threshold may include and other WLAN parameter threshold.

In some demonstrative embodiments, UE 118 may be configured to select an access network to be utilized by UE 118, for example, based on the RAN assisted WLAN interworking parameters. For example, UE 118 may be configured to select an access network to be utilized by UE 118, based on one or more rules to be applied to the RAN assisted WLAN interworking parameters and one or more measurements, e.g., with respect to one or more networks.

In some demonstrative embodiments, UE 118 may be connected to a first cellular RAT ("the source RAT") manager.

In one example, the source RAT may include the network controlled by eNB 106. In another example, the source RAT may include the network controlled by eNB 108. In another example, the source RAT may include the network controlled by RNC 110.

In some demonstrative embodiments, the source RAT manager may be configured to perform one or more offloading and/or load balancing operations, for example, when the source RAT has an increased load, e.g., when the source RAT is overloaded, when the source RAT is approaching an overload situation, when the load of the source RAT approaches a load threshold, and/or based on any other criteria, e.g., as described below.

In some demonstrative embodiments, the cellular manager of the source RAT may be configured to select between the WLAN offloading mechanism and the handover mechanism, e.g., as described below.

In some demonstrative embodiments, although the WLAN offloading mechanism provides UE 118 the ability to make a RAT selection and/or traffic steering decision, the cellular manager of the source RAT may influence, guide and/or control the RAT selection and/or traffic steering decision, for example, by providing to UE 118 RAN assisted WLAN interworking parameters, which may be configured, for example, based on the load of the source RAT and/or based on UE category.

In one example, offload controller 130 of eNB 106 may select to increase a number of UEs to steer to WLAN. According to this example, offload controller 130 of eNB 106 may configure the RAN assisted WLAN interworking parameters provided to UE 118 to be more "aggressive", e.g., to increase the probability that UE 118 will select to offload to the WLAN.

In some demonstrative embodiments, the cellular manager of the source RAT may manage a load of the source RAT, for example, by selecting, e.g., when a network load of the source RAT increases, to perform a load balancing operation, e.g., configured to decrease and/or avoid further increase in the load of the source RAT.

In some demonstrative embodiments, the cellular manager of the source RAT may select between performing a handover of one or more UEs to another cellular RAT, or adjusting the RAN assisted WLAN interworking parameters of the source RAT, e.g., to more "aggressive" parameters, to cause one or more UEs to offload to WLAN.

In some demonstrative embodiments, the cellular manager of the source RAT may send to at least one UE in the coverage area of the source RAT at least one offloading message, e.g., according to the offloading mechanism ("the selected offloading mechanism) selected by the cellular manager of the source RAT.

In some demonstrative embodiments, the offloading message may include RAN assisted WLAN interworking information, for example, when the selected offloading mechanism includes the first offloading mechanism, e.g., the WLAN offloading mechanism. For example, offload controller 130 of eNB 106 may determine RAN assisted WLAN interworking information, and cellular TRx 144, may transmit a message including the RAN assisted WLAN interworking information, e.g., as described below.

In some demonstrative embodiments, the offloading message may include an offloading trigger, to trigger offloading of the UE to another cellular network, for example, when the selected offloading mechanism includes the second offloading mechanism, e.g., the handover mechanism. For example, offload controller 130 of eNB 106 may select to handover UE 118 to the cell controlled by eNB 108 or RNC 110, and cellular TRx 144, may transmit to a message including an offloading trigger to trigger offloading of UE 118, for example, to the cell controlled by eNB 108 or RNC 110, e.g., as described below.

In some demonstrative embodiments, the cellular manager of the source RAT may have some information corresponding to a potential cellular network ("potential target RAT"), which may be considered for the handover of the one or more UEs.

In some demonstrative embodiments, the cellular manager of the source RAT may receive load information corresponding to a load of the potential target RAT, e.g., an indication if the load of the potential target RAT is low, moderate or high.

In some demonstrative embodiments, the load information corresponding to the load of the potential target RAT may not be enough to make an efficient, optimal and/or favorable decision at the source RAT as to whether to use the WLAN offloading mechanism or the handover mechanism.

For example, the potential target RAT may theoretically appear to be a good candidate for handover, for example, if the load information corresponding to the load of the potential target RAT indicates that the load in the target RAT is not high, e.g., that the load is moderate.

However, in some scenarios, the potential target RAT may not be a good candidate for handover, for example, even if the load information corresponding to the load of the potential target RAT indicates that the load in the potential target RAT is not high.

In one example, the load in the potential target RAT may not be high, for example, if the potential target RAT has already offloaded some UEs to the WLAN.

In such a case, if the source RAT takes into account only information about the load of the source RAT and the indicated load of the potential target RAT, the source RAT may initiate UE handover to the potential target RAT for load balancing of the source RAT.

However, since the target RAT may be already offloading UEs to the WLAN, the target RAT may eventually offload one or more of the same UEs, which were offloaded from the source RAT, to the WLAN, e.g., in order to prevent a load increase on the target RAT.

In some demonstrative embodiments, the cellular manager of the source RAT may be configured to select the WLAN offloading mechanism to offload UEs to the WLAN, for example, in situations where the handover offloading mechanism may be less effective.

In some demonstrative embodiments, the cellular manager of the source RAT may not be able to make an optimal, efficient, and/or favorable load balancing decision, for example, if the cellular manager of the source RAT is not provided with information regarding a load of at least one neighbor cell, e.g., a potential cellular RAT to which the one or more UEs may be handed over.

In some demonstrative embodiments, the cellular manager of the source RAT may not be able to make an optimal, efficient, and/or favorable load balancing decision, for example, if the cellular manager of the source RAT determines the RAN assisted WLAN interworking parameters of the source RAT, for example, independently of RAN assisted WLAN interworking parameters being used by neighbor cells.

In some demonstrative embodiments, the cellular manager of the source RAT may not be able to make an optimal, efficient, and/or favorable load balancing decision, for example, if the cellular manager of the source RAT determines the RAN assisted WLAN interworking parameters of the source RAT, for example, without taking into consideration the RAN assisted WLAN interworking parameters of the at least one potential cellular RAT.

In some demonstrative embodiments, eNB 106, eNB 108, and/or RNC 110 may be configured to enable a first cellular manager of eNB 106, eNB 108, and RNC 110, to make a load balancing decision, while taking into consideration a load of at least a second cellular manager of eNB 106, eNB 108, and RNC 110, e.g., as described below.

In some demonstrative embodiments, eNB 106, eNB 108, and/or RNC 110 may be configured to communicate with one another one or more WLAN offload parameters corresponding to the RAN assisted WLAN interworking parameters used by eNB 106, eNB 108, and/or RNC 110, e.g., as described below.

In some demonstrative embodiments, eNB 106 and eNB 108 may use X2AP signaling messages, e.g., enhanced X2AP signaling messages, to communicate with one another one or more WLAN offload parameters corresponding to the RAN assisted WLAN interworking parameters used by eNB 106 and/or eNB 108, e.g., as described below.

In some demonstrative embodiments, eNB 106 may send to eNB 108 an X2AP RESOURCE STATUS UPDATE message including the one or more WLAN offload parameters corresponding to the RAN assisted WLAN interworking parameters used by eNB 106; and/or eNB 108 may send to eNB 106 an X2AP RESOURCE STATUS UPDATE message including the one or more WLAN offload parameters corresponding to the RAN assisted WLAN interworking parameters used by eNB 108.

In one example, the RESOURCE STATUS UPDATE message may be sent, for example, by an eNB ("eNB2") to a neighboring eNB ("eNB1"), for example, to report results of requested measurements. For example, the RESOURCE STATUS UPDATE message may include the following format:

TABLE 1

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement ID | M | | INTEGER (1 ... 4095, ... ) | Allocated by eNB$_1$ | YES | reject |
| eNB2 Measurement ID | M | | INTEGER (1 ... 4095, ... ) | Allocated by eNB$_2$ | YES | reject |
| Cell Measurement Result | | 1 | | | YES | ignore |
| >Cell Measurement Result Item | | 1 ... <maxCellineNB> | | | EACH | ignore |
| >>Cell ID | M | | ECGI 9.2.14 | | | |
| >>Hardware Load Indicator | O | | 9.2.34 | | | |
| >>S1 TNL Load Indicator | O | | 9.2.35 | | | |
| >>Radio Resource Status | O | | 9.2.37 | | | |
| >>Composite Available Capacity Group | O | | 9.2.44 | | YES | ignore |
| >>ABS Status | O | | 9.2.58 | | YES | ignore |
| >>WLAN Offload Configuration | O | | | | YES | ignore |

TABLE 1-continued

| Range bound | Explanation |
|---|---|
| maxCellineNB | Maximum no. cells that can be served by an eNB. Value is 256. |

In some demonstrative embodiments, eNB 106 may send to eNB 108 an X2AP LOAD INFORMATION message including the one or more WLAN offload parameters corresponding to the RAN assisted WLAN interworking parameters used by eNB 106; and/or eNB 108 may send to eNB 106 an X2AP LOAD INFORMATION message including the one or more WLAN offload parameters corresponding to the RAN assisted WLAN interworking parameters used by eNB 108.

In one example, the X2AP LOAD INFORMATION message may be sent, for example, by an eNB ("eNB1") to one or more neighboring eNBs ("eNB2"), for example, to transfer load and interference co-ordination information. For example, the X2AP LOAD INFORMATION message may include the following format:

TABLE 2

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 ... <maxCellineNB> | | | EACH | ignore |
| >>Cell ID | M | | ECGI 9.2.14 | Id of the source cell | — | — |
| >>UL Interference Overload Indication | O | | 9.2.17 | | — | — |
| >>UL High Interference Information | | 0 ... <maxCellineNB> | | | — | — |
| >>>Target Cell ID | M | | ECGI 9.2.14 | Id of the cell for which the HII is meant | — | — |
| >>>UL High Interference Indication | M | | 9.2.18 | | — | — |
| >>Relative Narrowband Tx Power (RNTP) | O | | 9.2.19 | | — | — |
| >>ABS Information | O | | 9.2.54 | | YES | ignore |
| >>Invoke Indication | O | | 9.2.55 | | YES | ignore |
| >>Intended UL-DL Configuration | O | | ENUMERATED (sa0, sa1, sa2, sa3, sa4, sa5, sa6, ... ) | One of the UL-DL configurations defined in TS 36.211 [10]. The UL subframe(s) in the indicated configuration is subset of those in SIB1 UL-DL configuration. This IE applies to TDD only. | YES | ignore |
| >>Extended UL Interference Overload Info | O | | 9.2.67 | This IE applies to TDD only. | YES | ignore |
| >>WLAN Offload Configuration | O | | | | YES | ignore |

| Range bound | Explanation |
|---|---|
| maxCellineNB | Maximum no. cells that can be served by an eNB. Value is 256. |

In other embodiments, eNB 106 and/or eNB 108 may communicate one or more WLAN offload parameters corresponding to the RAN assisted WLAN interworking parameters as part of any other dedicated or enhanced X2AP message.

In some demonstrative embodiments, eNB 106 and/or eNB 108 may use S1AP signaling messages, e.g., enhanced S1AP signaling messages, to communicate with RNC 110 one or more WLAN offload parameters corresponding to the RAN assisted WLAN interworking parameters used by eNB 106, eNB 108 and/or RNC 110, e.g., as described below.

In some demonstrative embodiments, the S1AP signaling messages may be transferred from eNB 106 and/or eNB 108 to RNC 110, and/or from RNC 110 to eNB 106 and/or eNB 108, for example, via MME 152, e.g., using a RAN Information Management (RIM) Transfer, as part of a Self Organizing Networks (SON) Transfer RIM application, any other RIM application, and/or using any other application and/or protocol.

In some demonstrative embodiments, the cellular manager of the source RAT may be configured to send to the cellular manager of the target RAT one or more WLAN offload parameters corresponding to the RAN assisted WLAN interworking parameters used by the source RAT. For example, the cellular manager of the source RAT may transfer the one or more WLAN offload parameters to the target RAT, for example, in an RRC container, which may be sent from the source cell to the target cell, e.g., during handover.

In one example, eNB 106 may transmit to eNB 108 an RRC container including or more WLAN offload parameters corresponding to the RAN assisted WLAN interworking parameters used by eNB 106, for example, prior to handing over UE 118 from eNB 106 to eNB 108.

In some demonstrative embodiments, the cellular manager of the source RAT may receive from one or more potential target RATs the one or more WLAN offload parameters corresponding to the RAN assisted WLAN interworking parameters used by the potential target RATs, e.g., as described below. The WLAN offload parameters of a potential target RAT may provide an indication on how "aggressively" the potential target RAT offloads to WLAN.

In some demonstrative embodiments, the cellular manager of the source RAT may use the WLAN offload parameters of the potential target RAT, e.g., in addition to other load information corresponding to the load of the target RAT, for example, when making load balancing decisions, e.g., as described below.

In one example, the load information of the potential target RAT indicates that the load of the potential target RAT is moderate, while the WLAN offload parameters corresponding to the potential target RAT may be aggressive. According to this example, the cellular controller of the source RAT may determine that the potential target RAT may not be a good candidate for load balancing handover.

In some demonstrative embodiments, a first cellular manager of eNB 106, eNB 108, and RNC 110 may be configured to send to a second cellular manager of eNB 106, eNB 108, and RNC 110 one or more WLAN offload parameters corresponding to the RAN assisted WLAN interworking parameters corresponding to a first network controlled by the first cellular manager, e.g., as described below.

In some demonstrative embodiments, the one or more WLAN offload parameters may include one or more of the RAN assisted WLAN interworking parameters corresponding to the first network.

In some demonstrative embodiments, the one or more WLAN offload parameters may include parameters, which may be based on one or more of the RAN assisted WLAN interworking parameters corresponding to the first network, may be indicative of one or more of the RAN assisted WLAN interworking parameters corresponding to the first network, may be indicative of a magnitude of one or more of the RAN assisted WLAN interworking parameters corresponding to the first network, may be indicative of a direction of change, e.g., an increase or a decrease, of one or more of the RAN assisted WLAN interworking parameters corresponding to the first network, and/or may enable determining one or more of the RAN assisted WLAN interworking parameters corresponding to the first network.

In some demonstrative embodiments, offload controller 130 of eNB 106 may determine one or more RAN assisted WLAN interworking parameters corresponding to the cellular network controlled by eNB 106 ("the first RAN assisted WLAN interworking parameters").

In some demonstrative embodiments, eNB 106 may send the first RAN assisted WLAN interworking parameters to one or more UEs in coverage area 102. For example, cellular TRX 144 may transmit one or more messages including the first RAN assisted WLAN interworking parameters to UE 118.

In some demonstrative embodiments, eNB 106 may be configured to send one or more WLAN offload parameters corresponding to the first RAN assisted WLAN interworking parameters to one or more other cellular managers.

In one example, eNB 106 may be configured to send the WLAN offload parameters to another eNB, e.g., eNB 108, for example, to enable intra-LTE load-balancing coordination between eNB 106 and eNB 108. For example, eNB 106 may send to eNB 108 one or more X2AP messages including the WLAN offload parameters, e.g., via X2AP interface 136.

In another example, eNB 106 may be configured to send the WLAN offload parameters to a RNC, e.g., RNC 110, for example, to enable LTE-UMTS load balancing coordination between eNB 106 and RNC 110. For example, S1AP interface 134 may send the WLAN offload parameters to RNC 110 using one or more S1 messages, which may be sent to MME 152.

In some demonstrative embodiments, eNB 108 may determine one or more RAN assisted WLAN interworking parameters corresponding to the cellular network controlled by eNB 108 ("the second RAN assisted WLAN interworking parameters").

In some demonstrative embodiments, eNB 108 may send the second RAN assisted WLAN interworking parameters to one or more UEs in the coverage area of eNB 108.

In some demonstrative embodiments, eNB 108 may be configured to send one or more WLAN offload parameters corresponding to the second RAN assisted WLAN interworking parameters to one or more other cellular managers, e.g., to eNB 106 and/or to RNC 110.

In some demonstrative embodiments, offload controller 162 of RNC 110 may determine one or more RAN assisted WLAN interworking parameters corresponding to the cellular network controlled by RNC 110 ("the third RAN assisted WLAN interworking parameters").

In some demonstrative embodiments, RNC 110 may send the third RAN assisted WLAN interworking parameters to one or more UEs in coverage area of RNC 110. For example, interface 170 may send one or more messages including the third RAN assisted WLAN interworking parameters to UE 118, e.g., via Node B 112.

In some demonstrative embodiments, RNC 110 may be configured to send one or more WLAN offload parameters corresponding to the third RAN assisted WLAN interworking parameters to one or more other cellular managers.

In one example, RNC 110 may be configured to send the WLAN offload parameters to at least one eNB, e.g., eNB 106 and/or eNB 108, for example, to enable LTE-UMTS load-balancing coordination between RNC 110 and eNB 106 and/or eNB 108. For example, CN interface 160 may send the WLAN offload parameters to eNB 106 and/or eNB 110 via one or more elements of CN 150.

In another example, RNC 110 may send the WLAN offload parameters to another RNC (not shown), e.g., to enable intra-UMTS load-balancing coordination between RNC 110 and the other RNC.

In some demonstrative embodiments, the second cellular manager may be configured to determine RAN assisted WLAN interworking parameters corresponding to a second network controlled by the second cellular manager, while taking into consideration, the one or more WLAN offload parameters received from the first cellular manager.

In some demonstrative embodiments, eNB 106 may receive from eNB 108 the one or more WLAN offload parameters corresponding to the second RAN assisted WLAN interworking parameters. For example, X2AP interface 136 may receive from eNB 108 one or more X2AP messages including the WLAN offload parameters corresponding to the second RAN assisted WLAN interworking parameters.

In some demonstrative embodiments, eNB 106 may receive from RNC 110 the one or more WLAN offload parameters corresponding to the third RAN assisted WLAN interworking parameters. For example, S1AP interface 134 may receive from MME 152 one or more S1 messages including the WLAN offload parameters corresponding to the third RAN assisted WLAN interworking parameters.

In some demonstrative embodiments, offload controller 130 of eNB 106 may determine the first RAN assisted WLAN interworking parameters, e.g., to be sent from eNB 106 to UE 118, for example, based on the WLAN offload parameters corresponding to the second RAN assisted WLAN interworking parameters of eNB 108, and/or based on the WLAN offload parameters corresponding to the second RAN assisted WLAN interworking parameters of RNC 110.

In some demonstrative embodiments, eNB 108 may receive from eNB 106 the one or more WLAN offload parameters corresponding to the first RAN assisted WLAN interworking parameters.

In some demonstrative embodiments, eNB 108 may receive from RNC 110 the one or more WLAN offload parameters corresponding to the third RAN assisted WLAN interworking parameters.

In some demonstrative embodiments, eNB 108 may determine the second RAN assisted WLAN interworking parameters, e.g., to be sent from eNB 108 to UE 118, for example, based on the WLAN offload parameters corresponding to the first RAN assisted WLAN interworking parameters of eNB 106, and/or based on the WLAN offload parameters corresponding to the second RAN assisted WLAN interworking parameters of RNC 110.

In some demonstrative embodiments, RNC 110 may receive from eNB 106 and/or eNB 108 the one or more WLAN offload parameters corresponding to the first and/or second RAN assisted WLAN interworking parameters. For example, CN interface 160 may receive from CN 150 one or more messages including the WLAN offload parameters corresponding to the first and/or second RAN assisted WLAN interworking parameters.

In some demonstrative embodiments, offload controller 162 of RNC 110 may determine the third RAN assisted WLAN interworking parameters, e.g., to be sent from RNC 110 to UE 118, for example, based on the WLAN offload parameters corresponding to the first and/or second RAN assisted WLAN interworking parameters of eNB 106 and/or eNB 108, and/or based on WLAN offload parameters corresponding to RAN assisted WLAN interworking parameters of another RNC.

In some demonstrative embodiments, enabling a cellular manager of the first RAT, e.g., the source RAT, to receive from a second RAT, e.g., the potential target RAT, the WLAN offload parameters corresponding to the RAN assisted WLAN interworking parameters of the second RAT, e.g., as described above, may enable the cellular manager of the first RAT, e.g. the offload controller of the cellular manager, to make an efficient, preferable, favorable and/or optimal load balancing decision, for example, to select between a first offloading mechanism, e.g., the WLAN offloading, or a second offloading mechanism, e.g., handover to the second RAT.

In some demonstrative embodiments, the cellular manager of the first RAT may select between the first and second offloading mechanisms, e.g., based on how "aggressively" the second RAT offloads to WLAN.

For example, offload controller 130 of eNB 106 may select the first offloading mechanism, e.g., to update the RAN assisted WLAN interworking parameters provided to UEs within coverage area 102, for example, if the WLAN offload parameters from RNC 110 represent a WLAN offloading level greater than a predefined threshold.

In other embodiments, the cellular manager of the first RAT may select between the first and second offloading mechanisms based on any other criterion applied to the WLAN offload parameters received from the second RAT. For example, the cellular manager of the first RAT may select between the first and second offloading mechanisms, while taking into account one or more policies, a type of the potential target RAT, a type or category of one or more UEs to be offloaded, definition of one or more preferred networks, and/or any other criteria.

Figure 2:
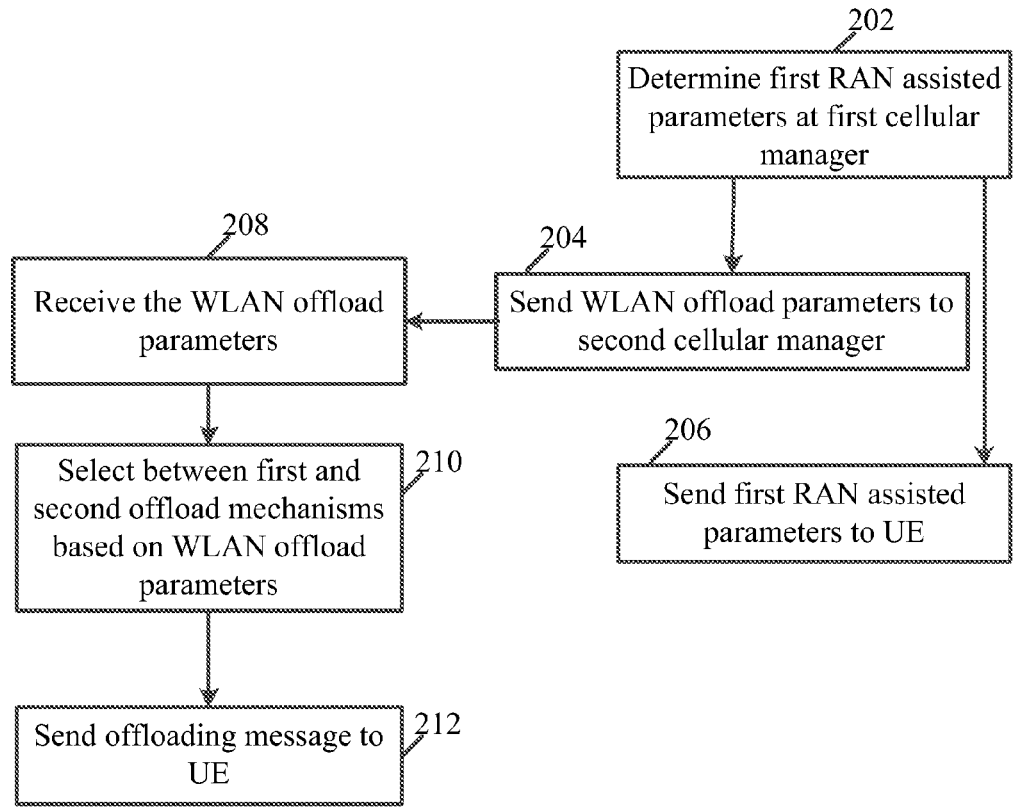
FIG. 2 is a schematic flow-chart illustration of a method of communicating Wireless Local Area Network (WLAN) offloading information between cellular managers, in accordance with some demonstrative embodiments.

Reference is made to FIG. 2, which schematically illustrates a method of controlling RAT communication managers, in accordance with some demonstrative embodiments. In some embodiments, one or more of the operations of the method of FIG. 2 may be performed by a wireless communication system e.g., system 100 (FIG. 1); a cellular manager, for example, an eNB, e.g., eNB 106 (FIG. 1) and/or eNB 108 (FIG. 1), a RNC, e.g., RNC 110 (FIG. 1), and/or an offload controller, e.g., offload controller 130 (FIG. 1), and/or offload controller 162 (FIG. 1).

As indicated at block 202, the method may include determining at a first cellular manager of a first cellular network one or more first RAN assisted WLAN interworking parameters corresponding to the first cellular network. For example, offload controller 130 (FIG. 1) may determine one or more first RAN assisted WLAN interworking parameters corresponding to the network controlled by eNB 106 (FIG. 1), e.g., as described above.

As indicated at block 204, the method may include sending to a second cellular manager of a second cellular network one or more WLAN offload parameters corresponding to the first RAN assisted WLAN interworking parameters. For example, interface 132 (FIG. 1) may send to eNB 108 (FIG. 1) and/or RNC 110 (FIG. 1), one or more WLAN offload parameters corresponding to the first RAN assisted WLAN interworking parameters, e.g., as described above.

As indicated at block 206, the method may include sending the first RAN assisted WLAN interworking parameters to at least one UE in the first cellular network. For example, cellular TRX 144 (FIG. 1) may transmit the first RAN assisted WLAN interworking parameters to one or more UEs within coverage area 102 (FIG. 1), e.g., UE 118 (FIG. 1).

As indicated at block 208, the method may include receiving the one or more WLAN offload parameters at the second cellular manager. For example, RNC 110 (FIG. 1) may receive the WLAN offload parameters from eNB 106 (FIG. 1), for example, via interface 160 (FIG. 1); and/or eNB 108 (FIG. 1) may receive the receive the WLAN offload parameters from eNB 106 (FIG. 1), for example, via one or more X2AP signaling messages, e.g., as described above.

As indicated at block 210, the method may include selecting, at the second cellular manager, a selected offloading mechanism from a first offloading mechanism to offload the UE to a WLAN, and the second offloading mechanism to offload at lest one UE from the second cellular network to the first cellular network. For example, RNC 110 (FIG. 1) may select between using a WLAN offloading mechanism or a handover mechanism, based on the WLAN offload parameters received from eNB 106 (FIG. 1); and/or eNB 108 (FIG. 1) select between using a WLAN offloading mechanism or a handover mechanism, based on the WLAN offload parameters received from eNB 106 (FIG. 1), e.g., as described above.

As indicated at block 212, the method may include sending to the UE of the second cellular network an offloading message according to the selected offloading mechanism, for example, a message including RAN assisted WLAN interworking parameters according to the WLAN offloading mechanism, or a handover message to trigger handover of the UE to the first cellular network. In one example, eNB 108 (FIG. 1) may transmit to UE 118 (FIG. 1) a message including RAN assisted WLAN interworking parameters, which are based on the WLAN offload parameters from eNB 106 (FIG. 1); or eNB 108 (FIG. 1) may transmit to UE 118 (FIG. 1) a message to trigger handover of UE 118 (FIG. 1) to eNB 106 (FIG. 1), e.g., as described above. In another example, RNC 110 (FIG. 1) may send to UE 118 (FIG. 1) a message, e.g., via Node B 112 (FIG. 1), including RAN assisted WLAN interworking parameters, which are based on the WLAN offload parameters from eNB 106 (FIG. 1); RNC 110 (FIG. 1) may send to UE 118 (FIG. 1) a message, e.g., via Node B 112 (FIG. 1), to trigger handover of UE 118 (FIG. 1) to eNB 106 (FIG. 1), e.g., as described above.

Figure 3:
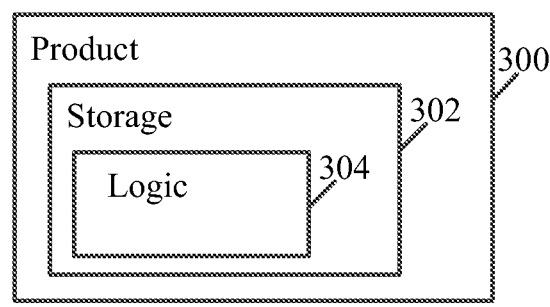
FIG. 3 is a schematic illustration of a product, in accordance with some demonstrative embodiments.

Reference is made to FIG. 3, which schematically illustrates a product of manufacture 300, in accordance with some demonstrative embodiments. Product 300 may include a non-transitory machine-readable storage medium 302 to store logic 304, which may be used, for example, to perform at least part of the functionality of a cellular manager, for example, an eNB, e.g., eNB 106 (FIG. 1) and/or eNB 108 (FIG. 1), a RNC, e.g., RNC 110 (FIG. 1), an offload controller, e.g., offload controller 130 (FIG. 1), and/or offload controller 162 (FIG. 1), and/or a message processor, e.g., message processor 148 (FIG. 1), and/or message processor 170 (FIG. 1); and/or to perform one or more operations of the method of FIG. 2. The phrase "non-transitory machine-readable medium" is directed to include all computer-readable media, with the sole exception being a transitory propagating signal.

In some demonstrative embodiments, product 300 and/or machine-readable storage medium 302 may include one or more types of computer-readable storage media capable of storing data, including volatile memory, non-volatile memory, removable or non-removable memory, erasable or non-erasable memory, writeable or re-writeable memory, and the like. For example, machine-readable storage medium 302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a first cellular manager to control a first cellular network, the first cellular manager comprising a first interface to receive a message including one or more Wireless Local Area network (WLAN) offload parameters of a second cellular manager of a second cellular network; an offload controller to select, based on the WLAN offload parameters of the second cellular manager, a selected offloading mechanism from a first offloading mechanism and a second offloading mechanism, the first offloading mechanism to offload a User Equipment (UE) to a WLAN, and the second offloading mechanism to offload the UE to the second cellular network; and a second interface to send to the UE an offloading message according to the selected offloading mechanism.

Example 2 includes the subject matter of Example 1, and optionally, wherein the offload controller is to select between the first and second offloading mechanisms based on a load of the second cellular manager and the WLAN offload parameters of the second cellular manager.

Example 3 includes the subject matter of Example 1 or 2, and optionally, wherein the offload controller is to select the first offloading mechanism, if the WLAN offload parameters of the second cellular manager represent a WLAN offloading level greater than a predefined threshold.

Example 4 includes the subject matter of any one of Examples 1-3, and optionally, wherein the offloading message comprises Radio Access Network (RAN) assisted WLAN interworking information, when the selected offloading mechanism comprises the first offloading mechanism.

Example 5 includes the subject matter of any one of Examples 1-4, and optionally, wherein the offloading message comprises an offloading trigger to trigger offloading of the UE to the second cellular network, when the selected offloading mechanism comprises the second offloading mechanism.

Example 6 includes the subject matter of any one of Examples 1-5, and optionally, wherein the WLAN offload parameters of the second cellular manager comprise at least one parameter selected from the group consisting of a cellular parameter threshold, a WLAN parameter threshold, and an offload preference indicator (OPI).

The first cellular manager of any one of Examples 1-6, and optionally, wherein the WLAN offload parameters are indicative of Radio Access Network (RAN) assisted WLAN interworking parameters of the second cellular manager.

Example 7 includes the subject matter of any one of Examples 1-7 being an Evolved Node B (eNB), the second interface comprising a cellular transceiver to transmit the offloading information to the UE.

Example 8 includes the subject matter of Example 8, and optionally, wherein the second cellular manager comprises another eNB, the first interface comprising an X2 Application protocol (X2AP).

Example 9 includes the subject matter of Example 8, and optionally, wherein the second cellular manager comprises a Radio Network Controller (RNC), the first interface comprising an S1 Application protocol (S1AP) to communicate with the RNC via a Mobility Management Entity (MME).

Example 10 includes the subject matter of any one of Examples 1-7 being a Radio Network Controller (RNC), the second cellular manager comprises an Evolved Node B (eNB), the first interface comprising a core network interface to communicate with the eNB via a core network, the second interface comprising a Node B interface to communicate with the UE via a Node B.

Example 11 includes the subject matter of any one of Examples 1-11 including a memory and a processor.

Example 12 includes a first cellular manager to control a first cellular network, the first cellular manager comprising an offload controller to determine one or more Radio Access Network (RAN) assisted WLAN interworking parameters; a first interface to send to a second cellular manager of a second cellular network one or more WLAN offload parameters corresponding to the RAN assisted WLAN interworking parameters; and a second interface to send the RAN assisted WLAN interworking parameters to a User Equipment (UE).

Example 13 includes the subject matter of Example 13, and optionally, wherein the WLAN offload parameters comprise at least one parameter selected from the group consisting of a cellular parameter threshold, a WLAN parameter threshold, and an offload preference indicator (OPI).

Example 14 includes the subject matter of Example 13 or 14 being an Evolved Node B (eNB), the second interface comprising a cellular transceiver to transmit the RAN assisted WLAN interworking parameters to the UE.

Example 15 includes the subject matter of Example 15, and optionally, wherein the second cellular manager comprises another eNB, the first interface comprising an X2 Application protocol (X2AP).

Example 16 includes the subject matter of Example 15, and optionally, wherein the second cellular manager comprises a Radio Network Controller (RNC), the first interface comprising an S1 Application protocol (S1AP) to communicate with the RNC via a Mobility Management Entity (MME).

Example 17 includes the subject matter of Example 13 or 14 being a Radio Network Controller (RNC), the second cellular manager comprises an Evolved Node B (eNB), the first interface comprising a core network interface to communicate with the eNB via a core network, the second interface comprising a Node B interface to communicate with the UE via a Node B.

Example 18 includes the subject matter of any one of Examples 13-18 including a memory and a processor.

Example 19 includes an Evolved Node B (eNB) to control a first cellular network, the eNB comprising a cellular network interface to receive at least one message including one or more Wireless Local Area network (WLAN) offload parameters of a cellular manager of a second cellular network; an offload controller to generate an offloading message based on the WLAN offload parameters of the second cellular manager; and a cellular transceiver to transmit the offloading message to a User Equipment (UE).

Example 20 includes the subject matter of Example 20, and optionally, wherein the offload controller is to select a selected offloading mechanism from a WLAN offload mechanism or a cellular offload mechanism based on the WLAN offload parameters, and to generate the offloading message, based on the selected offloading mechanism.

Example 21 includes the subject matter of Example 20 or 21, and optionally, wherein the offloading message comprises Radio Access Network (RAN) assisted WLAN interworking information, which is based on the one or more WLAN offload parameters.

Example 22 includes the subject matter of Example 20 or 21, and optionally, wherein the offloading message comprises an offloading trigger to trigger offloading of one or more User Equipment (UE) to the second cellular network.

Example 23 includes the subject matter of any one of Examples 20-23, and optionally, wherein the WLAN offload parameters comprise at least one parameter selected from the group consisting of a cellular parameter threshold, a WLAN parameter threshold, and an offload preference indicator (OPI).

Example 24 includes the subject matter of any one of Examples 20-24, and optionally, wherein the WLAN offload parameters are indicative of Radio Access Network (RAN) assisted WLAN interworking parameters of the cellular manager.

Example 25 includes the subject matter of any one of Examples 20-25, and optionally, wherein the cellular manager comprises another eNB, the cellular network interface comprising an X2 Application protocol (X2AP).

Example 26 includes the subject matter of any one of Examples 20-25, and optionally, wherein the cellular manager comprises a Radio Network Controller (RNC), the cellular network interface comprising an S1 Application protocol (S1AP) to communicate with the RNC via a Mobility Management Entity (MME).

Example 27 includes the subject matter of any one of Examples 20-27 including a memory and a processor.

Example 28 includes a method to be performed at a first cellular manager of a first cellular network, the method comprising receiving a message including one or more Wireless Local Area network (WLAN) offload parameters of a second cellular manager of a second cellular network; selecting, based on the WLAN offload parameters of the second cellular manager, a selected offloading mechanism from a first offloading mechanism and a second offloading mechanism, the first offloading mechanism to offload a User Equipment (UE) to a WLAN, and the second offloading mechanism to offload the UE to the second cellular network; and sending to the UE an offloading message according to the selected offloading mechanism.

Example 29 includes the subject matter of Example 29, and optionally, comprising selecting between the first and second offloading mechanisms based on a load of the second cellular manager and the WLAN offload parameters of the second cellular manager.

Example 30 includes the subject matter of Example 29 or 30, and optionally, comprising selecting the first offloading mechanism, if the WLAN offload parameters of the second cellular manager represent a WLAN offloading level greater than a predefined threshold.

Example 31 includes the subject matter of any one of Examples 29-31, and optionally, wherein the offloading message comprises Radio Access Network (RAN) assisted WLAN interworking information, when the selected offloading mechanism comprises the first offloading mechanism.

Example 32 includes the subject matter of any one of Examples 29-32, and optionally, wherein the offloading message comprises an offloading trigger to trigger offloading of the UE to the second cellular network, when the selected offloading mechanism comprises the second offloading mechanism.

Example 33 includes the subject matter of any one of Examples 29-33, and optionally, wherein the WLAN offload parameters of the second cellular manager comprise at least one parameter selected from the group consisting of a cellular parameter threshold, a WLAN parameter threshold, and an offload preference indicator (OPI).

Example 34 includes the subject matter of any one of Examples 29-34, and optionally, wherein the WLAN offload parameters are indicative of Radio Access Network (RAN) assisted WLAN interworking parameters of the second cellular manager.

Example 35 includes the subject matter of any one of Examples 29-35, and optionally, wherein the first cellular manager is an Evolved Node B (eNB).

Example 36 includes the subject matter of Example 36, and optionally, wherein the second cellular manager comprises another eNB, wherein receiving the message comprises receiving an X2 Application protocol (X2AP) message.

Example 37 includes the subject matter of Example 36, and optionally, wherein the second cellular manager comprises a Radio Network Controller (RNC), wherein receiving the message comprises receiving an S1 Application protocol (S1AP) message.

Example 38 includes the subject matter of any one of Examples 29-35, and optionally, wherein the first cellular manager is a Radio Network Controller (RNC), and wherein receiving the message comprises receiving the message from an Evolved Node B (eNB).

Example 39 includes a method to be performed at a first cellular manager of a first cellular network, the method comprising determining one or more Radio Access Network (RAN) assisted WLAN interworking parameters; sending to a second cellular manager of a second cellular network one or more WLAN offload parameters corresponding to the RAN assisted WLAN interworking parameters; and sending the RAN assisted WLAN interworking parameters to a User Equipment (UE).

Example 40 includes the subject matter of Example 40, and optionally, wherein the WLAN offload parameters comprise at least one parameter selected from the group consisting of a cellular parameter threshold, a WLAN parameter threshold, and an offload preference indicator (OPI).

Example 41 includes the subject matter of Example 40 or 41, and optionally, wherein the first cellular manager is an Evolved Node B (eNB).

Example 42 includes the subject matter of Example 42, and optionally, wherein the second cellular manager comprises another eNB, wherein sending the WLAN offload parameters comprises sending an X2 Application protocol (X2AP) message including the WLAN offload parameters.

Example 43 includes the subject matter of Example 42, and optionally, wherein the second cellular manager comprises a Radio Network Controller (RNC), wherein sending the WLAN offload parameters comprises sending an S1 Application protocol (S1AP) message.

Example 44 includes the subject matter of Example 40 or 41, and optionally, wherein the first cellular manager is a Radio Network Controller (RNC), and the second cellular manager is an Evolved Node B (eNB).

Example 45 includes a method to be performed at an Evolved Node B (eNB) to control a first cellular network, the method comprising receiving at least one message including one or more Wireless Local Area network (WLAN) offload parameters of a cellular manager of a second cellular network; generating an offloading message based on the WLAN offload parameters of the second cellular manager; and transmitting the offloading message to a User Equipment (UE).

Example 46 includes the subject matter of Example 46, and optionally, comprising selecting a selected offloading mechanism from a WLAN offload mechanism or a cellular offload mechanism based on the WLAN offload parameters, and generating the offloading message, based on the selected offloading mechanism.

Example 47 includes the subject matter of Example 46 or 47, and optionally, wherein the offloading message comprises Radio Access Network (RAN) assisted WLAN interworking information, which is based on the one or more WLAN offload parameters.

Example 48 includes the subject matter of Example 46 or 47, and optionally, wherein the offloading message comprises an offloading trigger to trigger offloading of one or more User Equipment (UE) to the second cellular network.

Example 49 includes the subject matter of any one of Examples 46-49, and optionally, wherein the WLAN offload parameters comprise at least one parameter selected from the group consisting of a cellular parameter threshold, a WLAN parameter threshold, and an offload preference indicator (OPI).

Example 50 includes the subject matter of any one of Examples 46-50, and optionally, wherein the WLAN offload parameters are indicative of Radio Access Network (RAN) assisted WLAN interworking parameters of the cellular manager.

Example 51 includes the subject matter of any one of Examples 46-51, and optionally, wherein the cellular manager comprises another eNB, wherein receiving the at least one message comprises receiving an X2 Application protocol (X2AP) message.

Example 52 includes the subject matter of any one of Examples 46-51, and optionally, wherein the cellular manager comprises a Radio Network Controller (RNC), wherein receiving the at least one message comprises receiving an S1 Application protocol (S1AP) message.

Example 53 includes a product including one or more tangible computer-readable non-transitory storage media comprising computer-executable instructions operable to, when executed by at least one computer processor, enable the at least one computer processor to implement a method at a first cellular manager of a first cellular network, the method comprising receiving a message including one or more Wireless Local Area network (WLAN) offload parameters of a second cellular manager of a second cellular network; selecting, based on the WLAN offload parameters of the second cellular manager, a selected offloading mechanism from a first offloading mechanism and a second offloading mechanism, the first offloading mechanism to offload a User Equipment (UE) to a WLAN, and the second offloading mechanism to offload the UE to the second cellular network; and sending to the UE an offloading message according to the selected offloading mechanism.

Example 54 includes the subject matter of Example 54, and optionally, wherein the method comprises selecting between the first and second offloading mechanisms based on a load of the second cellular manager and the WLAN offload parameters of the second cellular manager.

Example 55 includes the subject matter of Example 54 or 55, and optionally, wherein the method comprises selecting the first offloading mechanism, if the WLAN offload parameters of the second cellular manager represent a WLAN offloading level greater than a predefined threshold.

Example 56 includes the subject matter of any one of Examples 54-56, and optionally, wherein the offloading message comprises Radio Access Network (RAN) assisted WLAN interworking information, when the selected offloading mechanism comprises the first offloading mechanism.

Example 57 includes the subject matter of any one of Examples 54-57, and optionally, wherein the offloading message comprises an offloading trigger to trigger offloading of the UE to the second cellular network, when the selected offloading mechanism comprises the second offloading mechanism.

Example 58 includes the subject matter of any one of Examples 54-58, and optionally, wherein the WLAN offload parameters of the second cellular manager comprise at least one parameter selected from the group consisting of a cellular parameter threshold, a WLAN parameter threshold, and an offload preference indicator (OPI).

Example 59 includes the subject matter of any one of Examples 54-59, and optionally, wherein the WLAN offload parameters are indicative of Radio Access Network (RAN) assisted WLAN interworking parameters of the second cellular manager.

Example 60 includes the subject matter of any one of Examples 54-60, and optionally, wherein the first cellular manager is an Evolved Node B (eNB).

Example 61 includes the subject matter of Example 61, and optionally, wherein the second cellular manager comprises another eNB, wherein receiving the message comprises receiving an X2 Application protocol (X2AP) message.

Example 62 includes the subject matter of Example 61, and optionally, wherein the second cellular manager comprises a Radio Network Controller (RNC), wherein receiving the message comprises receiving an S1 Application protocol (S1AP) message.

Example 63 includes the subject matter of any one of Examples 54-60, and optionally, wherein the first cellular manager is a Radio Network Controller (RNC), and wherein receiving the message comprises receiving the message from an Evolved Node B (eNB).

Example 64 includes a product including one or more tangible computer-readable non-transitory storage media comprising computer-executable instructions operable to, when executed by at least one computer processor, enable the at least one computer processor to implement a method at a first cellular manager of a first cellular network, the method comprising determining one or more Radio Access Network (RAN) assisted WLAN interworking parameters; sending to a second cellular manager of a second cellular network one or more WLAN offload parameters corresponding to the RAN assisted WLAN interworking parameters; and sending the RAN assisted WLAN interworking parameters to a User Equipment (UE).

Example 65 includes the subject matter of Example 65, and optionally, wherein the WLAN offload parameters comprise at least one parameter selected from the group consisting of a cellular parameter threshold, a WLAN parameter threshold, and an offload preference indicator (OPI).

Example 66 includes the subject matter of Example 65 or 66, and optionally, wherein the first cellular manager is an Evolved Node B (eNB).

Example 67 includes the subject matter of Example 67 wherein the second cellular manager comprises another eNB, wherein sending the WLAN offload parameters comprises sending an X2 Application protocol (X2AP) message including the WLAN offload parameters.

Example 68 includes the subject matter of Example 67, and optionally, wherein the second cellular manager comprises a Radio Network Controller (RNC), wherein sending the WLAN offload parameters comprises sending an S1 Application protocol (S1AP) message.

Example 69 includes the subject matter of Example 65 or 66, and optionally, wherein the first cellular manager is a Radio Network Controller (RNC), and the second cellular manager is an Evolved Node B (eNB).

Example 70 includes a product including one or more tangible computer-readable non-transitory storage media comprising computer-executable instructions operable to, when executed by at least one computer processor, enable the at least one computer processor to implement a method an Evolved Node B (eNB) to control a first cellular network, the method comprising receiving at least one message including one or more Wireless Local Area network (WLAN) offload parameters of a cellular manager of a second cellular network; generating an offloading message based on the WLAN offload parameters of the second cellular manager; and transmitting the offloading message to a User Equipment (UE).

Example 71 includes the subject matter of Example 71, and optionally, wherein the method comprises selecting a selected offloading mechanism from a WLAN offload mechanism or a cellular offload mechanism based on the WLAN offload parameters, and generating the offloading message, based on the selected offloading mechanism.

Example 72 includes the subject matter of Example 71 or 72, and optionally, wherein the offloading message comprises Radio Access Network (RAN) assisted WLAN interworking information, which is based on the one or more WLAN offload parameters.

Example 73 includes the subject matter of Example 71 or 72, and optionally, wherein the offloading message comprises an offloading trigger to trigger offloading of one or more User Equipment (UE) to the second cellular network.

Example 74 includes the subject matter of any one of Examples 71-74, and optionally, wherein the WLAN offload parameters comprise at least one parameter selected from the group consisting of a cellular parameter threshold, a WLAN parameter threshold, and an offload preference indicator (OPI).

Example 75 includes the subject matter of any one of Examples 71-75, and optionally, wherein the WLAN offload parameters are indicative of Radio Access Network (RAN) assisted WLAN interworking parameters of the cellular manager.

Example 76 includes the subject matter of any one of Examples 71-76, and optionally, wherein the cellular manager comprises another eNB, wherein receiving the at least one message comprises receiving an X2 Application protocol (X2AP) message.

Example 77 includes the subject matter of any one of Examples 71-76, and optionally, wherein the cellular manager comprises a Radio Network Controller (RNC), wherein receiving the at least one message comprises receiving an S1 Application protocol (S1AP) message.

Example 78 includes an apparatus of cellular communication, the apparatus comprising means for receiving, at a first cellular manager of a first cellular network, a message including one or more Wireless Local Area network (WLAN) offload parameters of a second cellular manager of a second cellular network; means for selecting, based on the WLAN offload parameters of the second cellular manager, a selected offloading mechanism from a first offloading mechanism and a second offloading mechanism, the first offloading mechanism to offload a User Equipment (UE) to a WLAN, and the second offloading mechanism to offload the UE to the second cellular network; and means for sending to the UE an offloading message according to the selected offloading mechanism.

Example 79 includes the subject matter of Example 79, and optionally, comprising means for selecting between the first and second offloading mechanisms based on a load of the second cellular manager and the WLAN offload parameters of the second cellular manager.

Example 80 includes the subject matter of Example 79 or 80, and optionally, comprising means for selecting the first offloading mechanism, if the WLAN offload parameters of the second cellular manager represent a WLAN offloading level greater than a predefined threshold.

Example 81 includes the subject matter of any one of Examples 79-81, and optionally, wherein the offloading message comprises Radio Access Network (RAN) assisted WLAN interworking information, when the selected offloading mechanism comprises the first offloading mechanism.

Example 82 includes the subject matter of any one of Examples 79-82, and optionally, wherein the offloading message comprises an offloading trigger to trigger offloading of the UE to the second cellular network, when the selected offloading mechanism comprises the second offloading mechanism.

Example 83 includes the subject matter of any one of Examples 79-83, and optionally, wherein the WLAN offload parameters of the second cellular manager comprise at least one parameter selected from the group consisting of a cellular parameter threshold, a WLAN parameter threshold, and an offload preference indicator (OPI).

Example 84 includes the subject matter of any one of Examples 79-84, and optionally, wherein the WLAN offload parameters are indicative of Radio Access Network (RAN) assisted WLAN interworking parameters of the second cellular manager.

Example 85 includes the subject matter of any one of Examples 79-85, and optionally, wherein the first cellular manager is an Evolved Node B (eNB).

Example 86 includes the subject matter of Example 86, and optionally, wherein the second cellular manager comprises another eNB, wherein receiving the message comprises receiving an X2 Application protocol (X2AP) message.

Example 87 includes the subject matter of Example 86, and optionally, wherein the second cellular manager comprises a Radio Network Controller (RNC), wherein receiving the message comprises receiving an S1 Application protocol (S1AP) message.

Example 88 includes the subject matter of any one of Examples 79-85, and optionally, wherein the first cellular manager is a Radio Network Controller (RNC), and wherein receiving the message comprises receiving the message from an Evolved Node B (eNB).

Example 89 includes an apparatus of cellular communication, the apparatus comprising means for determining, at a first cellular manager of a first cellular network, one or more Radio Access Network (RAN) assisted WLAN interworking parameters; means for sending to a second cellular manager of a second cellular network one or more WLAN offload parameters corresponding to the RAN assisted WLAN interworking parameters; and means for sending the RAN assisted WLAN interworking parameters to a User Equipment (UE).

Example 90 includes the subject matter of Example 90, and optionally, wherein the WLAN offload parameters comprise at least one parameter selected from the group consisting of a cellular parameter threshold, a WLAN parameter threshold, and an offload preference indicator (OPI).

Example 91 includes the subject matter of Example 90 or 91, and optionally, wherein the first cellular manager is an Evolved Node B (eNB).

Example 92 includes the subject matter of Example 92, and optionally, wherein the second cellular manager comprises another eNB, wherein sending the WLAN offload parameters comprises sending an X2 Application protocol (X2AP) message including the WLAN offload parameters.

Example 93 includes the subject matter of Example 92, and optionally, wherein the second cellular manager comprises a Radio Network Controller (RNC), wherein sending the WLAN offload parameters comprises sending an S1 Application protocol (S1AP) message.

Example 94 includes the subject matter of Example 90 or 91, and optionally, wherein the first cellular manager is a Radio Network Controller (RNC), and the second cellular manager is an Evolved Node B (eNB).

Example 95 includes an apparatus of cellular communication, the apparatus comprising means for receiving, at an Evolved Node B (eNB) to control a first cellular network, at least one message including one or more Wireless Local Area network (WLAN) offload parameters of a cellular manager of a second cellular network; means for generating an offloading message based on the WLAN offload parameters of the second cellular manager; and means for transmitting the offloading message to a User Equipment (UE).

Example 96 includes the subject matter of Example 96, and optionally, comprising means for selecting a selected offloading mechanism from a WLAN offload mechanism or a cellular offload mechanism based on the WLAN offload parameters, and generating the offloading message, based on the selected offloading mechanism.

Example 97 includes the subject matter of Example 96 or 97, and optionally, wherein the offloading message comprises Radio Access Network (RAN) assisted WLAN interworking information, which is based on the one or more WLAN offload parameters.

Example 98 includes the subject matter of Example 96 or 97, and optionally, wherein the offloading message comprises an offloading trigger to trigger offloading of one or more User Equipment (UE) to the second cellular network.

Example 99 includes the subject matter of any one of Examples 96-99, and optionally, wherein the WLAN offload parameters comprise at least one parameter selected from the group consisting of a cellular parameter threshold, a WLAN parameter threshold, and an offload preference indicator (OPI).

Example 100 includes the subject matter of any one of Examples 96-100, and optionally, wherein the WLAN offload parameters are indicative of Radio Access Network (RAN) assisted WLAN interworking parameters of the cellular manager.

Example 101 includes the subject matter of any one of Examples 96-101, and optionally, wherein the cellular manager comprises another eNB, wherein receiving the at least one message comprises receiving an X2 Application protocol (X2AP) message.

Example 102 includes the subject matter of any one of Examples 96-101, and optionally, wherein the cellular manager comprises a Radio Network Controller (RNC), wherein receiving the at least one message comprises receiving an S1 Application protocol (S1AP) message.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A first cellular manager to control a first cellular network, the first cellular manager comprising:
    a first interface to receive a message including one or more Wireless Local Area network (WLAN) offload parameters of a second cellular manager of a second cellular network;
    an offload controller to select, based on the WLAN offload parameters of said second cellular manager, a selected offloading mechanism from a first offloading mechanism and a second offloading mechanism, said first offloading mechanism to offload a User Equipment (UE) to a WLAN, and said second offloading mechanism to offload said UE to said second cellular network; and
    a second interface to send to said UE an offloading message according to the selected offloading mechanism.

2. The first cellular manager of claim 1, wherein said offload controller is to select between said first and second offloading mechanisms based on a load of said second cellular manager and the WLAN offload parameters of said second cellular manager.

3. The first cellular manager of claim 1, wherein said offloading message comprises Radio Access Network (RAN) assisted WLAN interworking information, when said selected offloading mechanism comprises said first offloading mechanism.

4. The first cellular manager of claim 1, wherein said offloading message comprises an offloading trigger to trigger offloading of said UE to said second cellular network, when said selected offloading mechanism comprises said second offloading mechanism.

5. The first cellular manager of claim 1, wherein the WLAN offload parameters of said second cellular manager comprise at least one parameter selected from the group consisting of a cellular parameter threshold, a WLAN parameter threshold, and an offload preference indicator (OPI).

6. The first cellular manager of claim 1 being an Evolved Node B (eNB), said second interface comprising a cellular transceiver to transmit said offloading message to said UE.

7. The first cellular manager of claim 6, wherein said second cellular manager comprises another eNB, said first interface comprising an X2 Application protocol (X2AP).

8. The first cellular manager of claim 6, wherein said second cellular manager comprises a Radio Network Controller (RNC), said first interface comprising an S1 Application protocol (S1AP) to communicate with said RNC via a Mobility Management Entity (MME).

9. The first cellular manager of claim 1 being a Radio Network Controller (RNC), said second cellular manager comprises an Evolved Node B (eNB), said first interface comprising a core network interface to communicate with said eNB via a core network, said second interface comprising a Node B interface to communicate with said UE via a Node B.

10. The first cellular manager of claim 1 including a memory and a processor.

11. A first cellular manager to control a first cellular network, the first cellular manager comprising:
    an offload controller to determine one or more Radio Access Network (RAN) assisted WLAN interworking parameters;
    a first interface to send to a second cellular manager of a second cellular network one or more WLAN offload parameters corresponding to said RAN assisted WLAN interworking parameters; and
    a second interface to send the RAN assisted WLAN interworking parameters to a User Equipment (UE).

12. The first cellular manager of claim 11, wherein the WLAN offload parameters comprise at least one parameter selected from the group consisting of a cellular parameter threshold, a WLAN parameter threshold, and an offload preference indicator (OPI).

13. The first cellular manager of claim 11 being an Evolved Node B (eNB), said second interface comprising a cellular transceiver to transmit said RAN assisted WLAN interworking parameters to said UE.

14. The first cellular manager of claim 13, wherein said second cellular manager comprises another eNB, said first interface comprising an X2 Application protocol (X2AP).

15. The first cellular manager of claim 13, wherein said second cellular manager comprises a Radio Network Controller (RNC), said first interface comprising an S1 Application protocol (S1AP) to communicate with said RNC via a Mobility Management Entity (MME).

16. The first cellular manager of claim 11 being a Radio Network Controller (RNC), said second cellular manager comprises an Evolved Node B (eNB), said first interface comprising a core network interface to communicate with said eNB via a core network, said second interface comprising a Node B interface to communicate with said UE via a Node B.

17. The first cellular manager of claim 11 including a memory and a processor.

18. A method to be performed at an Evolved Node B (eNB) to control a first cellular network, the method comprising:
receiving at least one message including one or more Wireless Local Area network (WLAN) offload parameters of a cellular manager of a second cellular network;
generating an offloading message based on the WLAN offload parameters of said cellular manager; and
transmitting the offloading message to a User Equipment (UE).

19. The method of claim 18 comprising selecting a selected offloading mechanism from a WLAN offload mechanism or a cellular offload mechanism based on the WLAN offload parameters, and generating said offloading message, based on the selected offloading mechanism.

20. The method of claim 18, wherein said offloading message comprises Radio Access Network (RAN) assisted WLAN interworking information, which is based on the one or more WLAN offload parameters.

21. The method of claim 18, wherein said offloading message comprises an offloading trigger to trigger offloading of one or more User Equipment (UE) to said second cellular network.

22. The method of claim 18, wherein the WLAN offload parameters comprise at least one parameter selected from the group consisting of a cellular parameter threshold, a WLAN parameter threshold, and an offload preference indicator (OPI).

23. A product including one or more tangible computer-readable non-transitory storage media comprising computer-executable instructions operable to, when executed by at least one computer processor, enable the at least one computer processor to implement operations at a first cellular manager of a first cellular network, the operations comprising:
receiving a message including one or more Wireless Local Area network (WLAN) offload parameters of a second cellular manager of a second cellular network;
selecting, based on the WLAN offload parameters of said second cellular manager, a selected offloading mechanism from a first offloading mechanism and a second offloading mechanism, said first offloading mechanism to offload a User Equipment (UE) to a WLAN, and said second offloading mechanism to offload said UE to said second cellular network; and
sending to said UE an offloading message according to the selected offloading mechanism.

24. The product of claim 23, wherein said offloading message comprises Radio Access Network (RAN) assisted WLAN interworking information, when said selected offloading mechanism comprises said first offloading mechanism.

25. The product of claim 23, wherein said offloading message comprises an offloading trigger to trigger offloading of said UE to said second cellular network, when said selected offloading mechanism comprises said second offloading mechanism.

* * * * *